United States Patent [19]
Bares

[11] Patent Number: 5,739,665
[45] Date of Patent: Apr. 14, 1998

[54] RADIO MODEM DOCKING STATION FOR PALM-SIZED COMPUTER

[75] Inventor: Steven John Bares, Ridgewood, N.J.

[73] Assignee: EnBloc, Inc., Portland, Oreg.

[21] Appl. No.: 590,396

[22] Filed: Jan. 25, 1996

[51] Int. Cl.$^6$ ................................................. H01M 10/46
[52] U.S. Cl. ................................................. 320/2
[58] Field of Search ........................ 320/2, 5, 30, 39; 361/683, 686; D14/100, 102

[56] References Cited

U.S. PATENT DOCUMENTS

| | | | |
|---|---|---|---|
| 3,597,673 | 8/1971 | Burkett et al. | 320/5 |
| 3,614,583 | 10/1971 | Burkett et al. | 320/5 |
| 3,617,851 | 11/1971 | Du Puy et al. | 320/22 |
| 4,016,473 | 4/1977 | Newman | 320/14 |
| 4,302,714 | 11/1981 | Yefsky | 320/5 |
| 4,654,574 | 3/1987 | Thaler | 320/14 |
| 4,746,852 | 5/1988 | Martin | 320/20 |
| 4,829,225 | 5/1989 | Podrazhansky | 320/14 |
| 5,324,925 | 6/1994 | Koenck et al. | 235/472 |
| 5,331,580 | 7/1994 | Miller et al. | 364/708 |
| 5,371,734 | 12/1994 | Fischer | 370/18 |
| 5,452,180 | 9/1995 | Register et al. | 361/686 |
| 5,468,948 | 11/1995 | Koenck et al. | 235/472 |
| 5,528,758 | 6/1996 | Yeh | 395/200.08 |
| 5,536,590 | 7/1996 | Cheiky | 429/7 |
| 5,552,957 | 9/1996 | Brown et al. | 361/683 |
| 5,604,663 | 2/1997 | Shin et al. | 361/686 |

*Primary Examiner*—Edward Tso
*Attorney, Agent, or Firm*—Marger, Johnson, et al.

[57] ABSTRACT

A portable RF docking station is detachably coupled to a palm-sized computer to provide extended wireless communication through a radio modem and wireline communication through a wireline modem. Both modems are contained inside the docking station and are powered by rechargeable batteries. The docking station includes a housing having a flat platform, a side section that extends vertically upward along a side edge of the platform and a rear section that extends vertically upward along a rear edge of the platform. The housing in combination with a data connector holds the computer and docking station together as one cohesive unit. A four-stage charging circuit maintains the rechargeable battery in a fully charged condition.

13 Claims, 7 Drawing Sheets

RADIO MODEM DOCKING STATION FOR PALM-SIZED COMPUTER

BACKGROUND OF THE INVENTION

This invention relates generally to wireless communication systems for portable computers and more particularly to a portable radio frequency (RF) docking station.

Current lap-top computers and radio modems are not capable of operating in heavy industrial applications. For example, lap-top computers are too large to constantly carry around and operate on industrial job sites. Palm-sized computers store and manipulate stored information and are easily carried by personnel while walking around at different industrial job sites. However, palm-sized computers cannot effectively transfer information real time to computer networks or other computer systems.

Radio modems allow wireless data communication between portable computers and computer system networks. However, radio modems are either too heavy or too awkward to constantly carry around when used in conjunction with a palm-sized computer. For example, a rechargeable battery and separate communication and power cables are needed to operate the radio modem in conjunction with the portable computer. The battery, power cable, communication cable, radio modem and computer must all be connected together and transported when the system is in use. The radio modem and other components are easily disconnected, difficult to carry and are easily damaged if carried around in severe environmental conditions or heavy industrial applications. Thus, palm-sized computers become unportable when connected to modems.

Battery operated modems can insert into the RS-232 port of a palm-sized computer such as the Hewlett-Packard Model No. 100. However, the radio modems are small and can only carry small rechargeable batteries. Because the rechargeable batteries are small, the modem only operates for short periods of time. Therefore, the radio modem has limited use such as for message paging, and is not capable of conducting extended wireless communication between the palm-sized computer and other computer systems.

Small radio modems are also not securely attached to the portable computer. Thus, the modem can be easily damaged or disconnected from the portable computer when used in industrial environments.

Accordingly, a need remains for an easy-to-carry, battery-operated radio modem that is quickly attached and detached to a portable computer while also providing portable operation for extended periods of time.

SUMMARY OF THE INVENTION

A portable RF docking station is detachably coupled to a palm-sized computer providing extended wireless communication between the computer and a computer network.

The docking station contains a radio modem for transmitting and receiving wireless communications and a rechargeable battery that provides portable power. The modem and battery are contained within a unique housing that provides a quick secure mechanical coupling between the computer and the modem while also providing power and communication connections between the computer and the radio modem.

The docking station housing includes a platform with an outside profile which is substantially the same size and shape as the outside profile of the palm-sized computer. A connector extends out of the housing and detachably engages the computer's data terminal with the radio modem. The connector also holds the computer firmly to the housing. Thus, the entire docking station can reside within the operator's palm while holding the computer, modem and battery supply together in a single integrated arrangement. The housing, while relatively small, is large enough to hold large, rechargeable batteries.

A wireline modem is contained within the housing for connecting the computer to a network server through a hard-wired communication path. A multiplexer/modem select circuit selectively couples either the radio modem or the wireline modem to the computer.

A single voltage regulator is used to regulate the battery voltage into the radio modem. The battery voltage is selected to match the radio modem operating voltage. The battery can then be coupled directly to the radio modem eliminating additional voltage regulation circuitry While increasing battery operating life.

A four-stage battery charging circuit in the docking station increases charging capacity of the rechargeable batteries. A soft start charge stage eases the rechargeable batteries into a fast charge stage by gradually increasing the current to a selected fast charge rate. The fast charge stage applies a series of charge and discharge pulses to the battery until fully charged. A topping charge applies current at a low rate to the battery to ensure a full charge. A maintenance charge is then used to offset natural self-discharge of the battery.

The special battery charging circuitry in combination with the relatively large rechargeable batteries allow the radio modem to operate remotely for extended periods of time.

The foregoing and other objects, features and advantages of the invention will become more readily apparent from the following detailed description of a preferred embodiment of the invention which proceeds with reference to the accompanying drawings.

DETAILED DESCRIPTION

Figure 1:
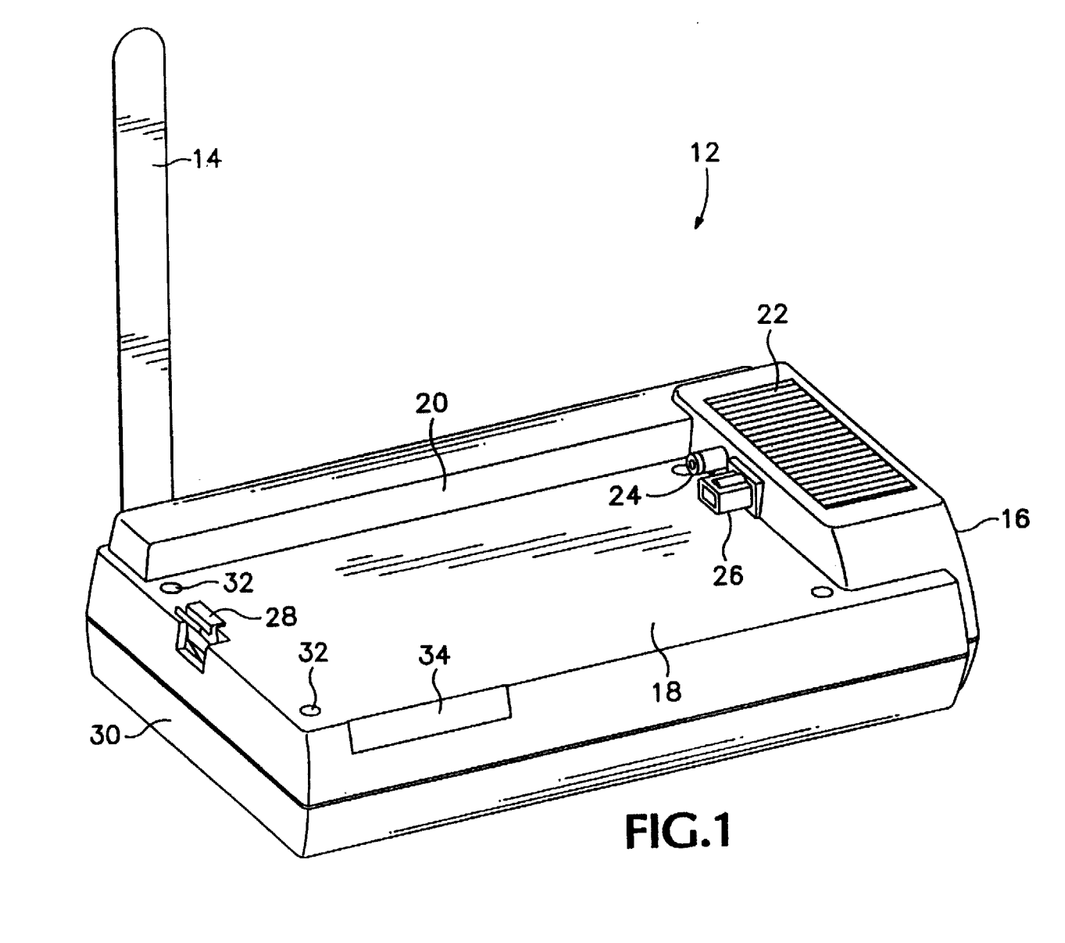
FIG. 1 is a perspective view of an RF docking station according to the invention.
Figure 2:
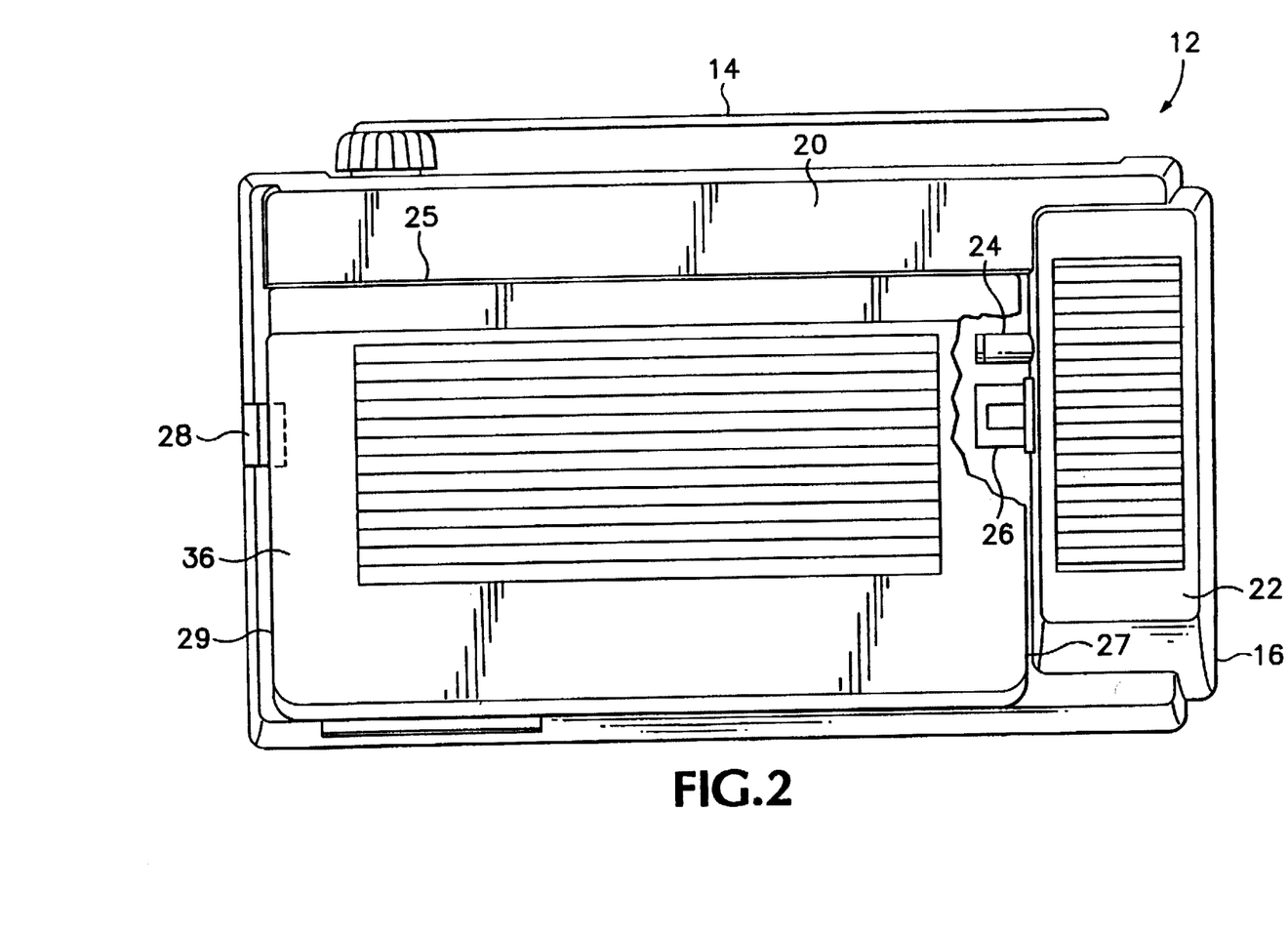
FIG. 2 is a top view of the RF docking station shown in FIG. 1.

Referring to FIG. 1, a portable docking station 12 comprises a housing 16 that holds a radio modem 40 (FIG. 4) used for wireless data communications. The docking station 12 includes a platform 18 that holds a palm-sized computer 36 (FIG. 2). A side section 22 extends vertically upward from a side edge of the platform 18. A connector 26 extends horizontally out from an inside face of side section 22 and detachably engages with a data terminal on the computer 36. A power plug 24 extends vertically out of the inside face of side section 22 and connects an external DC power supply 50 (FIG. 5) to computer 36. An antenna 14 is rotatably coupled to a back side of the casing 16.

A rear section 20 extends vertically up from a rear edge of platform 18 and lies along a rear end of the computer 36 when seated on platform 18. A spring clip 28 holds computer 36 down against platform 18. Recesses 32 seat protuberances that extend from bottom corners of computer 36. A notch 34 on the front side of casing 16 serves as a finger grip for lifting the computer 36 up from docking station 12. The housing 16 is made from a molded plastic and has a substantially rectangular shape approximately seven inches long, five inches wide and two inches thick.

FIG. 2 is a top view of the docking station 12 shown coupled to a palm-sized computer 36. The computer 36 is shown in a fully seated position on top of platform 18. A back end 25 of the computer 36 lies along rear section 20 and a side end 27 of computer 36 lies along side section 22. In the seated position, the clip 28 is springingly engaged to a second side end 29 of computer 36 and the connectors 24 and 26 are fully inserted into mating connectors in computer 36. The antenna 14 is shown in a retracted position lying substantially flush along the back side of casing 16.

Figure 3:
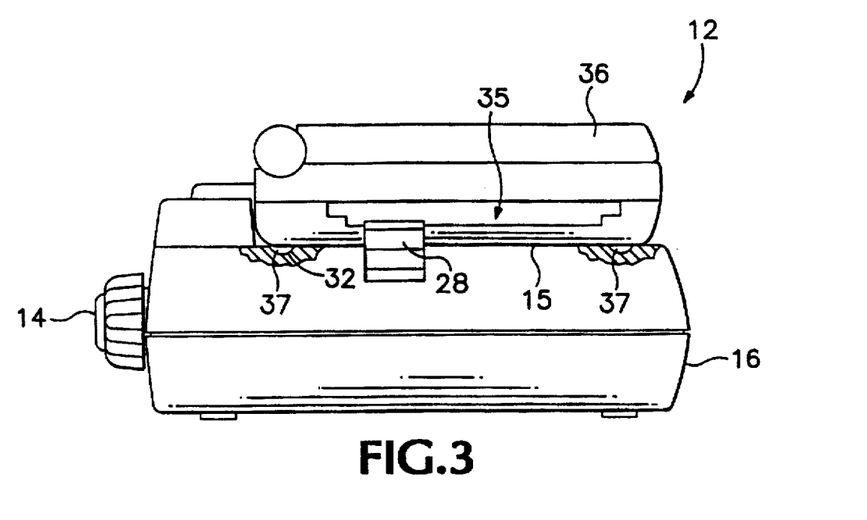
FIG. 3 is a side view of the RF docking station shown in FIG. 1.

FIG. 3 is a partially broken-away side view of the docking station 12. In the fully seated position, clip 28 seats into a cavity 35 on the computer 36 and protuberances 37 on the bottom side of the computer 36 seat into recesses 32 (FIG. 1). The entire bottom side 15 of the computer 36 rests securely against platform 18 providing an integrated computer and radio modem system.

As is shown in FIGS. 1-3, the docking station 12 is only slightly larger than the palm-sized computer 36. Thus, the computer and radio modem together utilize only a small amount of space. As a result, the computer and modem system can be carried in a purse or brief case which is not possible with other detachable radio modem systems. The docking station is capable of operating in heavy industrial applications where the system may be occasionally dropped, bumped against equipment or exposed to outside environmental conditions.

The unique shape of casing 16 in combination with connectors 24, 26 and clip 28 allow quick and secure mounting of computer 36 to docking station 12 without using loose wires or cables. For example, to attach the computer 36 to docking station 12, the power and data terminals of computer 36 are simply inserted into connectors 24 and 26, respectively. As the computer is inserted into the connectors, clip 28 automatically locks into cavity 35. Thus, the computer and docking station are mechanically and electrically coupled together at the same time.

The platform 18 has a top plan profile that is substantially the same shape as a top plan profile of computer 36. Since the docking station 12 extends along the entire bottom side of the computer, sufficient space is available inside casing 16 for holding large rechargeable batteries.

The docking station can also provide other functions in a typical office setting. For example, side section 20 may include additional slots for holding paper clips, note pads, etc. Thus, the docking station 12 can also serve as a desk organizer.

Figure 4:
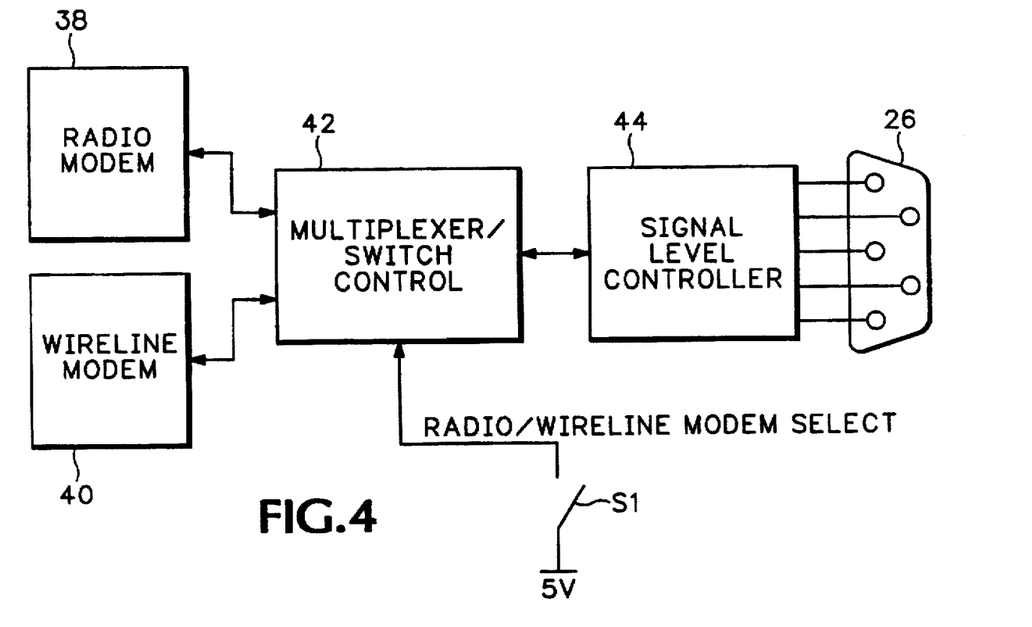
FIG. 4 is a diagram of a data control circuit for the RF docking station.

FIG. 4 is a schematic diagram of a data control circuit inside housing 16. Radio modem 38 and a wireline modem 40 are each coupled to a signal level controller circuit 44 through a multiplexer and switch control circuit 42. A switch S1 is coupled to circuit 42 and selectively connects either the radio modem 38 or the wireline modem 40 to computer 36 through connector 26.

The wireline modem 40 provides a hardwired data communication path and radio modem 38 provides a wireless data communication from computer 36 to an external computer system network (not shown). Radio modem 38, wireline modem 40, multiplexer/switch control circuit 42, and signal level controller 44 are commercially available devices well known to those skilled in the art and are, therefore, not described in detail.

Figure 5:
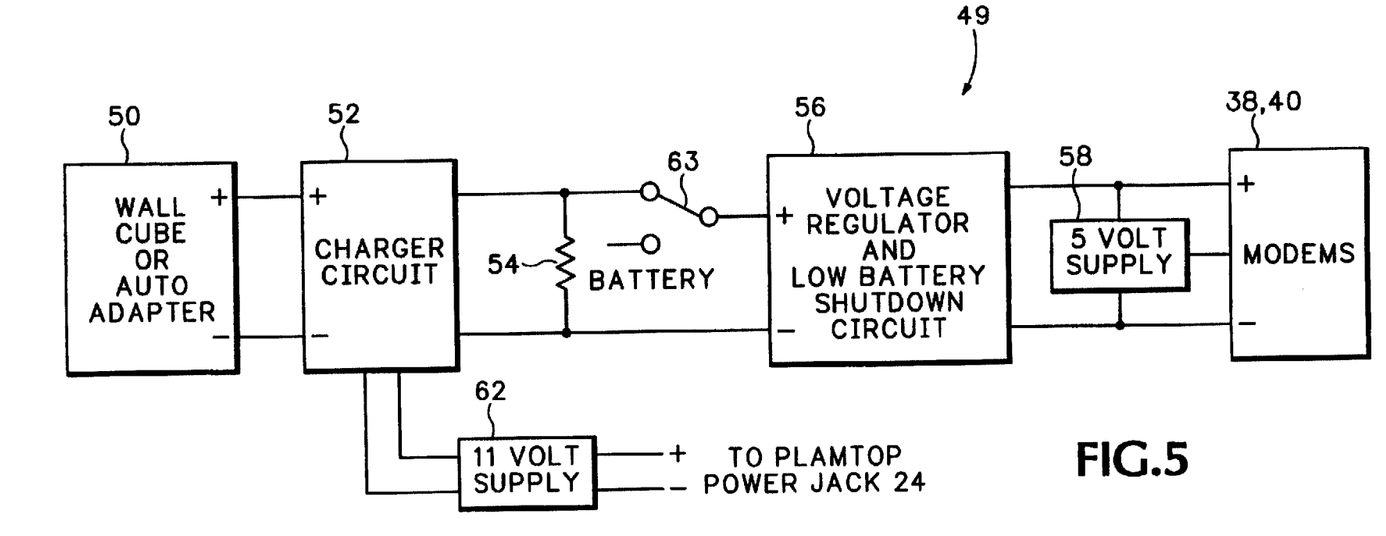
FIG. 5 is a diagram of a power control circuit for the RF docking station.

FIG. 5 is a diagram showing a power control circuit 49 located inside docking station 12. A direct current (DC) voltage is supplied by one of a variety of power sources 50. For example, the DC power source 50 may be a wall cube alternating current (AC)-to-DC converter or an auto adapter from a car battery. The DC power source 50 is coupled to a charger circuit 52 that supplies power to a rechargeable battery 54.

A switch 63 selectively couples the battery 54 to a voltage regulator and low battery shutdown circuit 56. The output of circuit 56 is coupled along with a voltage supply circuit 58 to radio modem 38 and the voltage supply circuit 58 is coupled to wireline modem 40. A second voltage supply circuit 62 is coupled between the charger circuit 52 and the power jack 24 (FIG. 1).

Figure 6:
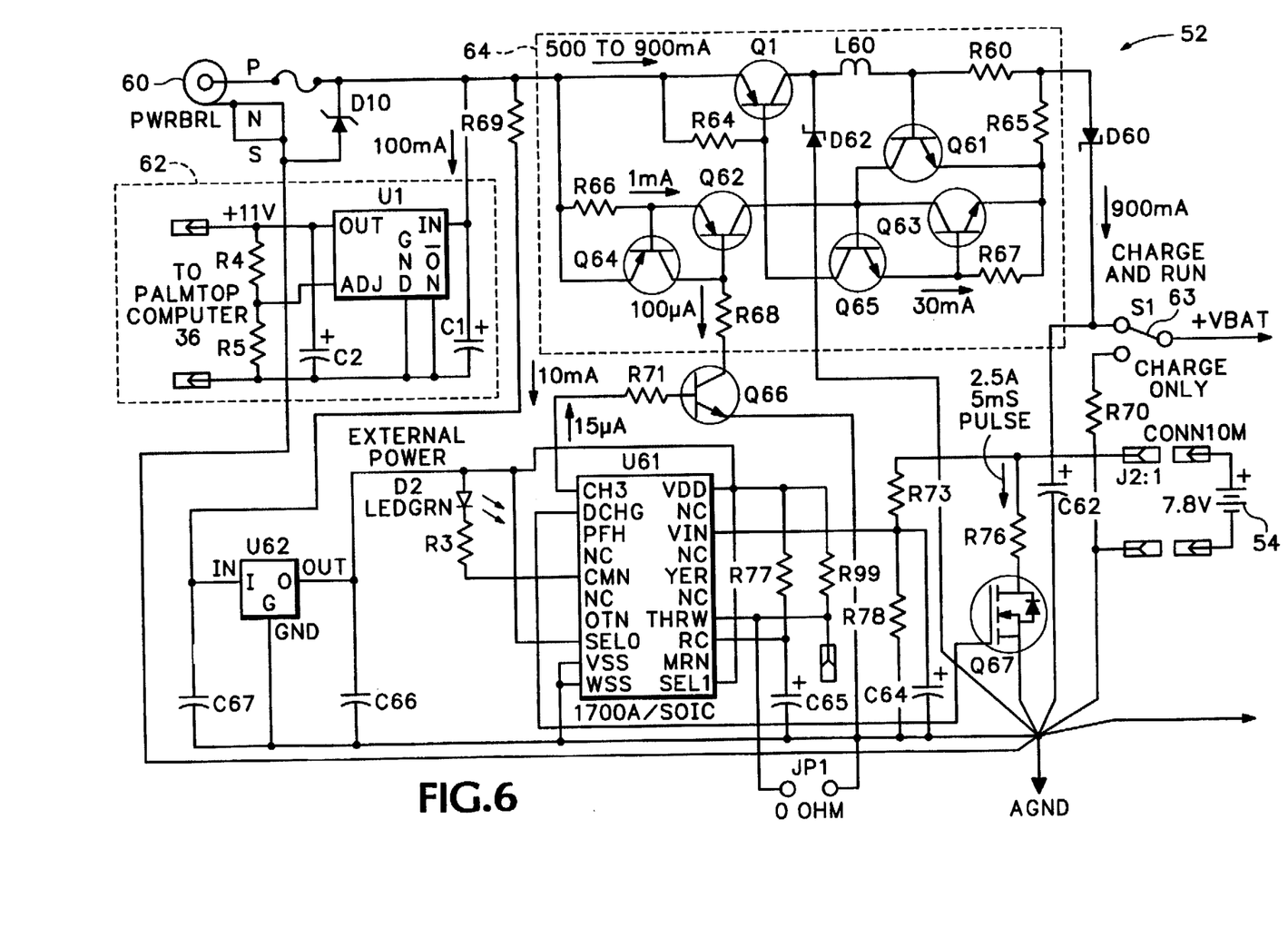
FIG. 6 is a detailed diagram of a charging circuit for the power control circuit shown in FIG. 5.

FIG. 6 is a detailed diagram of the charger circuit 52 shown in FIG. 5. A power jack 60 is coupled to the DC power source 50 (FIG. 5) which provides power to the computer 36 through voltage supply circuit 62, to a timing sequencer U61 and to a switching power supply 64. The voltage supply circuit 62 includes a voltage regulator U1 that generates an 11 Volt supply voltage for operating the computer 36.

Chip U61 generates a timing sequence for the switching power supply circuit 64. A transistor Q1 switches on and off while an inductor L60 provides a constant current supply for charging battery 54 and running the radio modem 38 at the same time. A CHG pin on chip U61 controls the switching sequence of circuit 64. A DCHG pin on chip U61 is coupled to transistor Q67 that provides a high current discharge pulse to battery 54.

The charging circuit 52 conducts four charging stages to increase charge capacity of battery 54. A soft start charge stage is conducted for approximately two minutes. The soft start charge stage gradually increases current to a fast charge rate. During the soft charge stage, only positive current pulses are applied to battery 54 and discharge current pulses from transistor Q67 are disabled. The duty cycle of the applied current from inductor L60 is increased to a fast charge rate by extending the current pulse on every cycle until the charging pulse is about one second in duration.

In a second fast charging stage, the charging current is applied in a series of charge and discharge pulses. The technique consists of generating a positive current charging pulse from circuit 64 followed by a high current, short duration discharge pulse generated from transistor Q67. The chip U61 conducts charge, rest, discharge and voltage monitoring periods that repeat every second until the battery 54 is fully charged.

The charge/discharge pulses in combination with a brief rest period allow accurate charge measurements of battery 54. Space charge effects occur around battery electrodes while measuring conductivity in a battery. The space charge effects cause inaccurate readings of the battery conductivity. By charging and discharging the battery, space charges do not build up. The reduction of space charge effects allow more accurate readings of the battery conductivity for more effective battery charging.

A third topping charge stage applies current at a slower rate than the second fast charge stage to prevent battery heating, but at a high enough rate to ensure full battery charge. The topping charge stage applies the lower charging current for approximately two hours. The current topping charge stage consists of the same pulse technique used during the fast charge stage, however, the duty cycle of the pulse sequence is reduced to one charging pulse every five seconds.

A fourth maintenance charge cycle offsets the natural self-discharge of battery 54 by keeping the battery primed at peak charge. After the topping charge stage ends, the maintenance charge stage begins to reduce the duty cycle of the applied current pulses to one charging pulse every 20 seconds. The maintenance charge lasts for as long as the battery 54 remains connected to the charger circuit 52.

Figure 7:
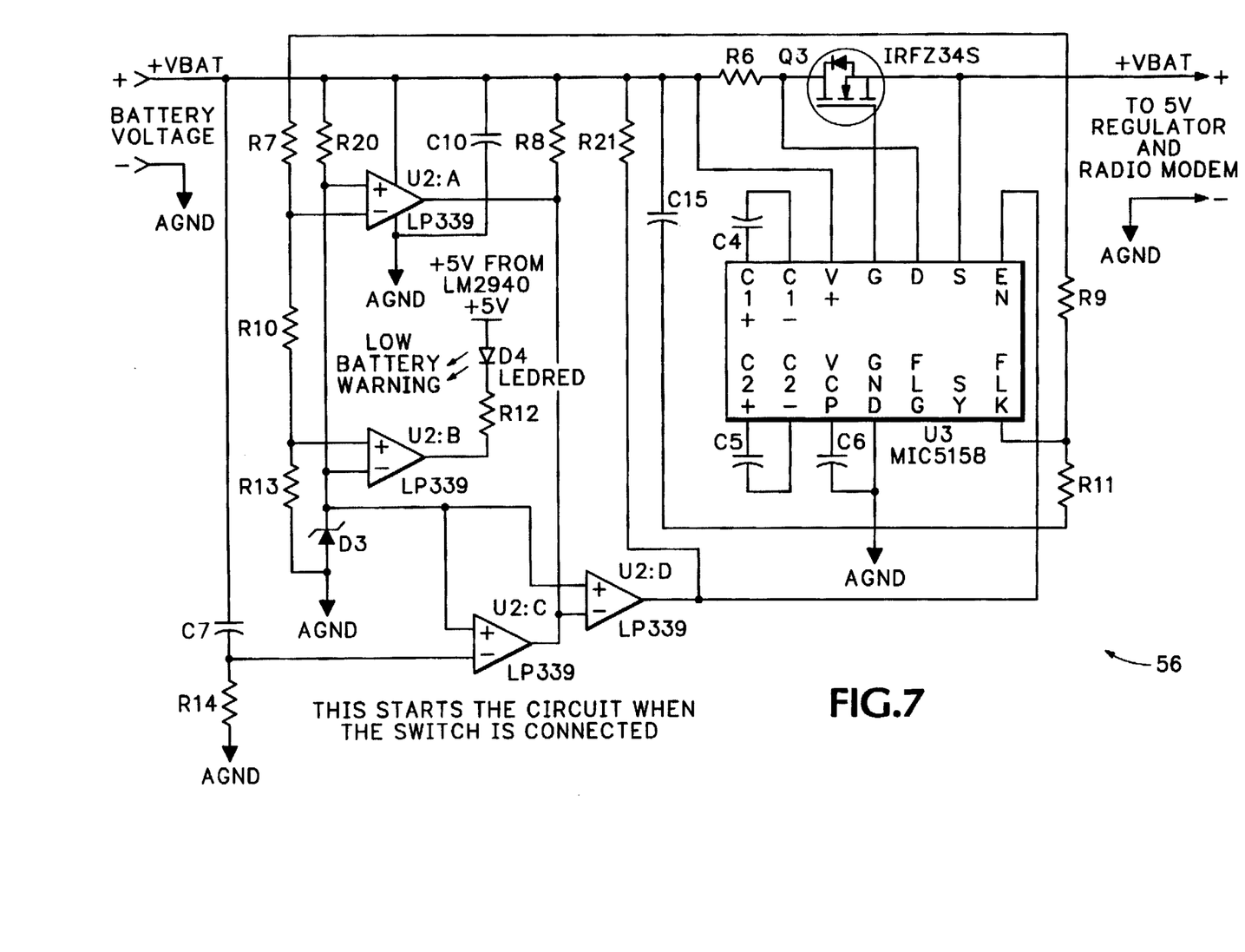
FIG. 7 is a detailed diagram of a voltage regulator and low battery shutdown circuit for the power control circuit shown in FIG. 5.
Figure 8:
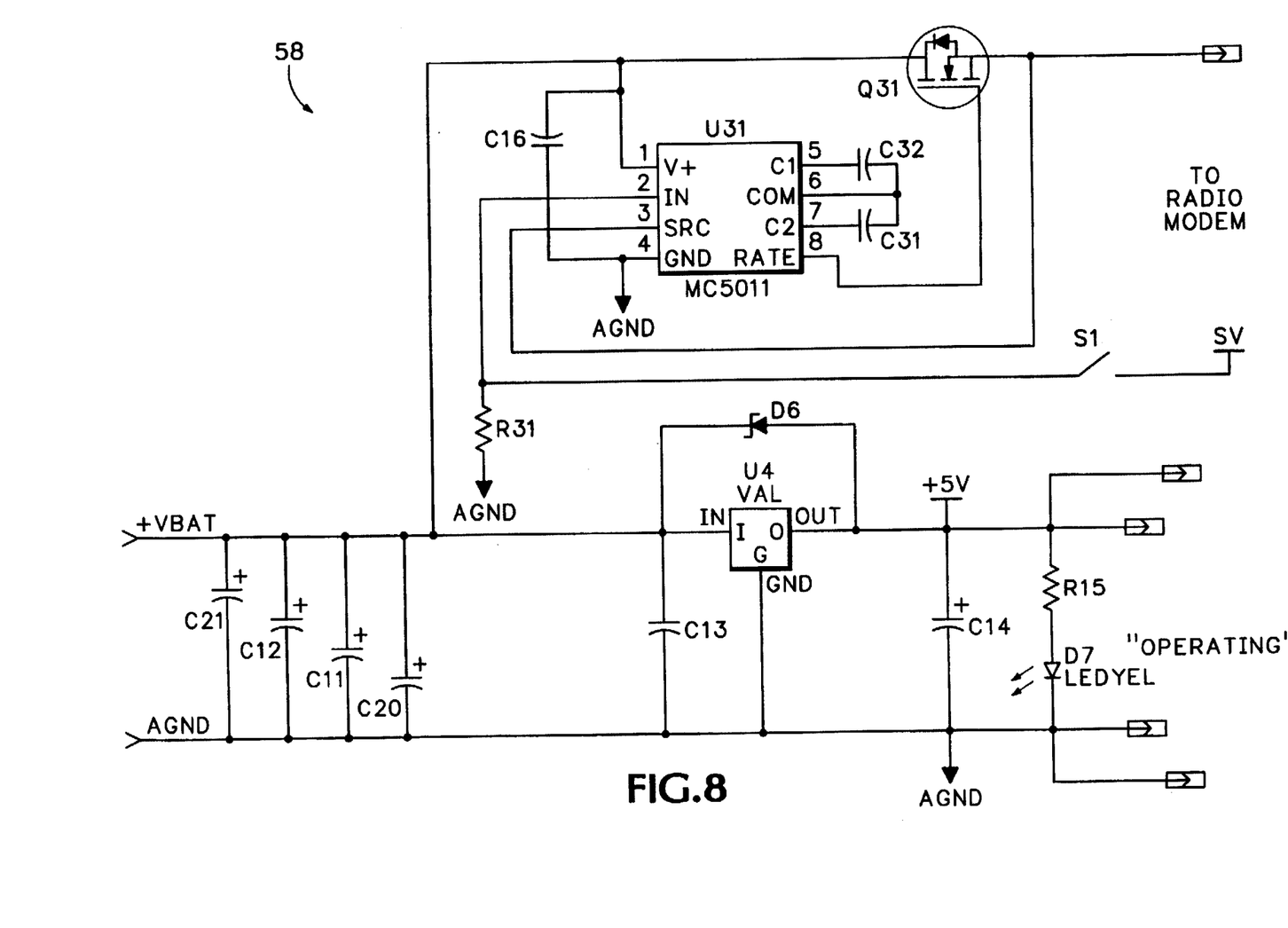
FIG. 8 is a detailed diagram of a 5 Volt power supply for the power control circuit shown in FIG. 5.

FIGS. 7 and 8 are detailed diagrams of the voltage regulator and battery shutdown circuit 56 and 5 Volt supply 58 shown in FIG. 5. The voltage regulator circuit 56 allows charge and discharge pulses to be supplied to battery 54 while at the same time powering the radio modem 38. The voltage from battery 54 is compared with a reference voltage generated by diode D3. The voltage across voltage divider circuit R7, R10 and R13 is set to go below the voltage supplied across reference diode D3 when the battery 54 is at 10% charge capacity. At 10% capacity, light emitting diode (LED) D4 is activated. When the capacity of battery 54 goes below 10%, the output of comparator U2:A drives comparator U2:D to disable chip U3. Chip U3 shuts off transistor Q3 disconnecting battery 54 from radio modem 38.

After battery 54 has been disconnected, the switch 63 must be turned off and then on. After power supply 50 is reconnected to circuit 56, a pulse from comparator U2:C changes the state of comparator U2:D resetting chip U3 back into an active state. Chip U3 turns transistor Q3 back on reconnecting battery 54 to radio modem 38.

The output voltage from transistor Q3 is set at approximately 8.4 Volts. If the voltage across battery 54 rises above 8.4 Volts, the voltage divider R9, R11 generates an overvoltage signal into chip U3. Transistor Q3 and chip U3 then operate as a voltage regulator where chip U3-throttles down transistor Q3 maintaining the voltage to radio modem 38 at 8.4 Volts. If the voltage from battery 54 drops below 8.3 Volts, chip U3 switches transistor Q3 completely on.

The output voltage of battery 54 is selected to match the operating voltage of radio modem 38. Thus, battery 54 can be coupled directly to the radio modem 38 without using intermediary voltage regulators that step down the battery voltage.

The radio modem 38 includes an internal voltage regulator that maintains the operating voltage supplied by battery 54 at a constant level. Thus, energy is conserved and, in turn, modem operating time is increased by eliminating additional voltage regulators. The battery 54 maintains sufficient charge for operating the radio modem 38 for up to 10 hours.

Referring to FIG. 8, 5 Volt supply 58 comprises a voltage regulator U4 that powers 5 Volt circuitry in the docking station including the 5 Volt parts in the radio modem 38. Chip U31 is used for switching on and off radio modem 38 (FIG. 4). The regulated 8.4 Volts output from transistor Q3 in FIG. 7, is selectively connected and disconnected to the radio modem 38 by transistor Q31. When closed, switch S1 forces chip U31 to turn on transistor Q31. When open, switch S1 forces chip U31 to turn off transistor Q31.

Having described and illustrated the principles of the invention in a preferred embodiment thereof, it should be apparent that the invention can be modified in arrangement and detail without departing from such principles.

I claim all modifications and variation coming within the spirit and scope of the following claims:

1. A hand-held RF docking station for removably holding a palm-sized computer, comprising:

a radio modem for providing wireless data communication;

a data control circuit coupled between the computer and the radio modem;

a power control circuit having a rechargeable battery selectively coupled to the radio modem and a programmable charging circuit coupled to the battery for increasing battery charge capacity; and a palm-sized housing for containing the radio modem, the data control circuit, and the power control circuit while at the same time serving as a hand-held docking station for removably holding the computer and for detachably coupling the computer to the modem.

2. A docking station according to claim 1 wherein the power control circuit includes a voltage regulator circuit coupled between the rechargeable battery and the radio modem, the rechargeable battery having a battery voltage matching a radio modem operating voltage.

3. A docking station according to claim 2 wherein the rechargeable battery is coupled by the voltage regulator directly to the radio modem.

4. A docking station according to claim 2 wherein the programmable charging circuit is coupled between the rechargeable battery and the voltage regulator.

5. A docking station according to claim 1 including a wireline modem coupled to the data control circuit, the data control circuit selectively connecting one of said radio modem and said wireline modem to the computer.

6. A docking station according to claim 1 wherein the computer has an outside perimeter with a given profile and the housing includes a substantially flat platform with an outside perimeter with a given profile substantially the same as the given profile of the computer.

7. A docking station according to claim 6 wherein the housing comprises molded plastic having a substantially rectangular shape with a back section that extends vertically up above a back edge of the platform and a side section that extends vertically up along a side edge of the platform.

8. A docking station according to claim 7 wherein the side section includes a data connector that extends out a side face of the side section for transferring data between the radio modem and the computer.

9. A docking station according to claim 8 including a power connector extending out the side face of the side section for powering the computer.

10. A docking station according to claim 1 wherein said housing includes a clip springingly engaged to the computer for securing the computer to the docking station.

11. A hand-held radio modem docking station for a palm-sized computer comprising:

a radio modem for transmitting and receiving wireless data communications;

a wireline modem for transmitting and receiving wireline communications;

a palm-sized housing containing the radio modem and the wireline modem while at the same time serving as a platform for holding the palm-sized computer and for detachably coupling the computer to the radio and wireline modems;

a data connector selectively coupled between one of said radio modem and said wireline modem, the data connector extending from the housing and detachably engaging with the palm-sized computer holding the computer down on the housing; and a power circuit contained within the housing and coupled to the radio modem and the wireline modem, the power circuit having a rechargeable battery and a programmable charging circuit.

12. A docking station according to claim 11 wherein the battery operates the radio modem for at least 10 hours.

13. A docking station according to claim 12 including a voltage regulator coupled between the battery and the radio modem.

* * * * *